United States Patent [19]
Finley

[11] Patent Number: 5,852,899
[45] Date of Patent: Dec. 29, 1998

[54] EMERGING INFLATABLE SUBMERGING PROPERTY PROTECTOR

[76] Inventor: Glenn E. Finley, 1760 Forster Ave., Memphis, Tenn. 38114

[21] Appl. No.: 833,390

[22] Filed: Apr. 8, 1997

[51] Int. Cl.⁶ .................................................. E04B 1/34
[52] U.S. Cl. ............................. 52/2.24; 52/2.11; 52/2.22
[58] Field of Search .................. 52/2.11, 2.12, 52/2.13, 2.14, 2.15, 2.16, 2.17, 2.18, 2.19, 2.21, 2.22, 2.23, 2.29, 2.25, 2.26, 3–5, 66, DIG. 12

[56] References Cited

U.S. PATENT DOCUMENTS

| | | |
|---|---|---|
| 3,548,904 | 12/1970 | Mackell ........................................ 150/5 |
| 3,783,766 | 1/1974 | Boucher ..................................... 98/35 R |
| 4,206,575 | 6/1980 | Leonard ......................................... 52/3 |
| 4,283,888 | 8/1981 | Cros ............................................... 52/3 |
| 4,856,228 | 8/1989 | Robinson ..................................... 47/29 |
| 4,858,395 | 8/1989 | McQuirk ........................................ 52/3 |
| 5,048,240 | 9/1991 | Dupre et al. .................................. 52/4 |
| 5,566,512 | 10/1996 | Page ......................................... 52/2.16 |
| 5,579,794 | 12/1996 | Sporta ........................................... 52/4 |

*Primary Examiner*—Carl D. Friedman
*Assistant Examiner*—Beth A. Aubrey
*Attorney, Agent, or Firm*—Patent & Trademark Services; Joseph H. McGlynn

[57] ABSTRACT

A framework that can be erected over the structure that is to be protected. The framework has a plurality of telescoping supports that are securely anchored to the ground. A plurality of inflatable panels, with rims attached, are designed to be attached to the telescoping supports and when inflated will enclose the structure to be protected. When deflated the panels and frames will be enclosed in a covered trench that encircles the structure to be protected.

6 Claims, 3 Drawing Sheets

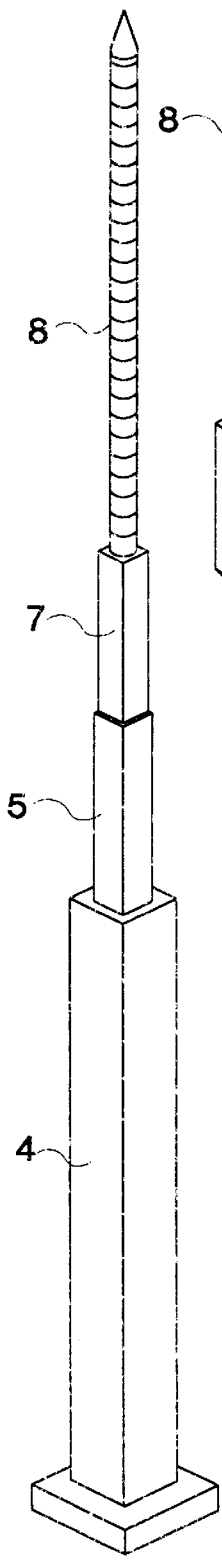
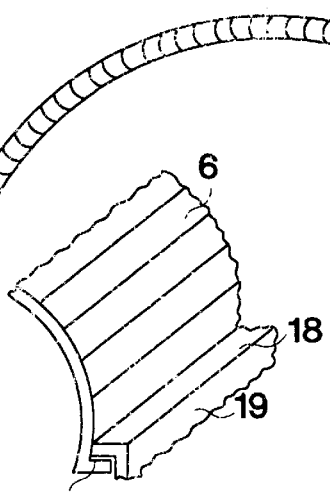
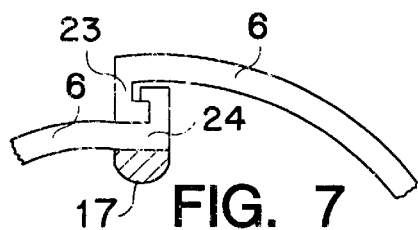
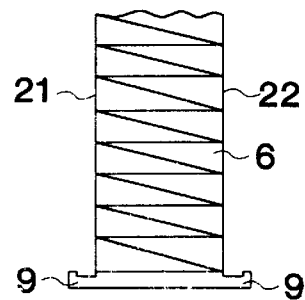
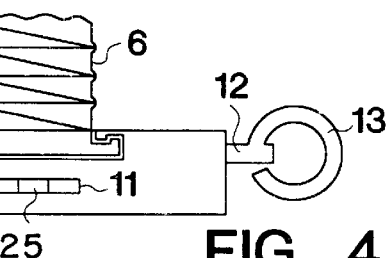
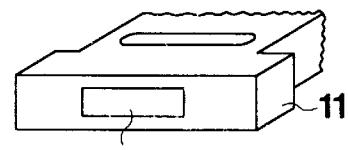
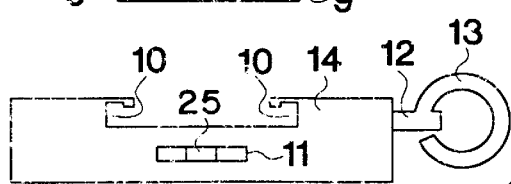
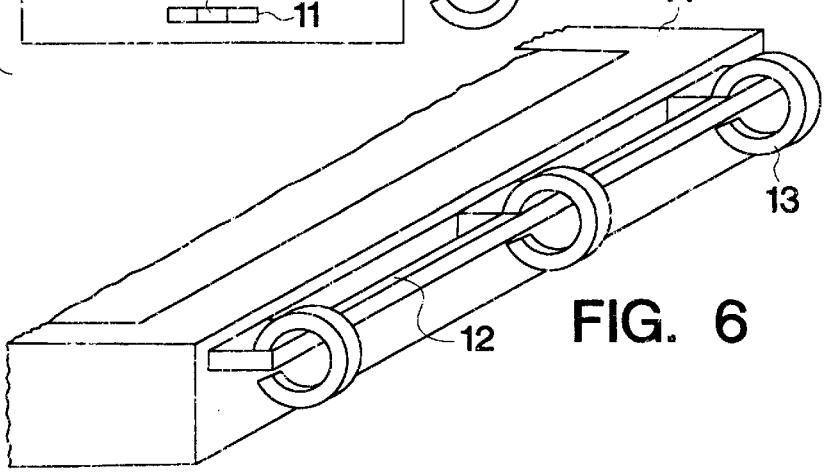

EMERGING INFLATABLE SUBMERGING PROPERTY PROTECTOR

BACKGROUND OF THE INVENTION

This invention relates in general to protectors for property and, in particular, for an inflatable protector for houses, trailers or other types of structures.

DESCRIPTION OF THE PRIOR ART

In the prior art various types of protectors for structures have been devised however, these structures have been expensive to construct and once constructed have had an unpleasant aesthetic appearance. Also, the prior art structures have proven inoperative in that they not only did not protect the property they enclosed, they were incapable of protecting themselves from such natural forces as hurricanes and tornadoes.

Various types of protective devices have been proposed in the prior art. For example, U.S. Pat. No. 3,548,904 discloses a cargo blanket which includes fluid impervious compartments capable of being inflated to form a protective cover.

U.S. Pat. No. 3,783,766 discloses a bag-like cover which provides a sealed enclosure for equipment which is susceptible to atmospheric deterioration.

U.S. Pat. No. 4,206,575 discloses an insulating and weatherproof cover for a mobile home which has an outer waterproof layer and an inner foam-type layer bonded thereto.

U.S. Pat. No. 4,283,888 discloses a covering of interlaced mineral fibers which forms a heat insulating and protected roof structure.

U.S. Pat. No. 4,858,395 discloses a fire resistant sheet which can be draped over a structure to envelope and protect the structure.

SUMMARY OF THE INVENTION

This invention consists of a framework that can be erected over the structure that is to be protected. The framework has a plurality of telescoping supports that are securely anchored to the ground. A plurality of inflatable panels, with rims attached, are designed to be attached to the telescoping supports and when inflated will enclose the structure to be protected. When deflated the panels and frames will be enclosed in a covered trench that encircles the structure to be protected.

It is an object of the present invention to provide an inflatable structure protector that is esthetically pleasing and unobtrusive when not in use.

It is also an object of the present invention to provide a structure protector that is easily and conveniently erected around the structure to be protected.

These and other objects and advantages of the present invention will be fully apparent from the following description, when taken in connection with the annexed drawings.

BRIEF DESCRIPTION OF THE DRAWINGS

FIG. 3 shows the holder for the inflatable portion of the protector and a portion of the protector in an inflated condition.

FIG. 4 shows the holder for the inflatable portion of the protector and a portion of the protector in a deflated condition.

FIG. 5 is a partial view of a part of the holder showing the air intake openings.

FIG. 6 is a partial view of another part of the holder.

FIG. 7 is a partial view of the inflated panels interlocked.

FIG. 8 is a partial view of one of the panels as it is interlocked and sealed at the bottom of the panel.

FIG. 9 is a view of one of the supporting posts for the protective enclosure.

FIG. 10 is a view of one of the supporting posts for the protective enclosure in an arched over position.

DESCRIPTION OF THE PREFERRED EMBODIMENT

Figure 1:
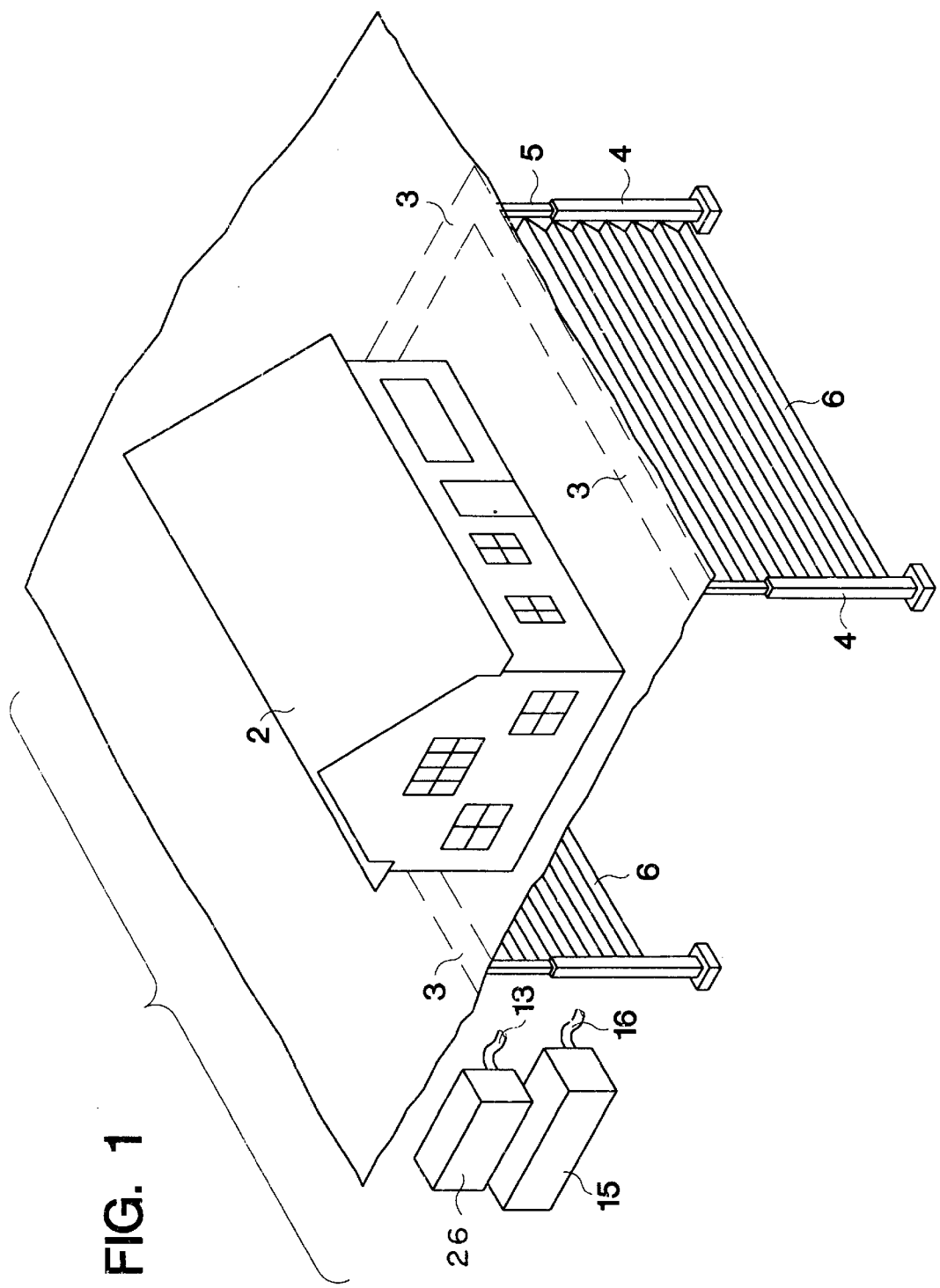
FIG. 1 shows a structure with the protective enclosure in its nonuse position.

FIG. 1 shows the present invention with some of the telescoping support posts 4 erected around the sides of a structure 2. Although only two telescoping support posts 4 are shown in FIG. 1, it is understood that this is for illustration purposes only. The total number of telescoping support posts 4 that will be used will depend on the size of the structure to be protected. Also, in FIG. 1 only the protective panel members 6 around the sides of the house are shown. It should be understood that other protective panel members 6 will also be placed at the front and the rear of the structure 2, but are not shown in FIG. 1 for the sake of clarity. Also shown in FIG. 1 are the air pumps 14 with air supply tube 27 which will supply air to the inflatable panel members 6 which will be explained below . Element 15 is a supply tank for hydraulic fluid and 16 is a supply pipe for supplying the hydraulic fluid to the telescoping support posts 4 as will be described below.

Figure 2:
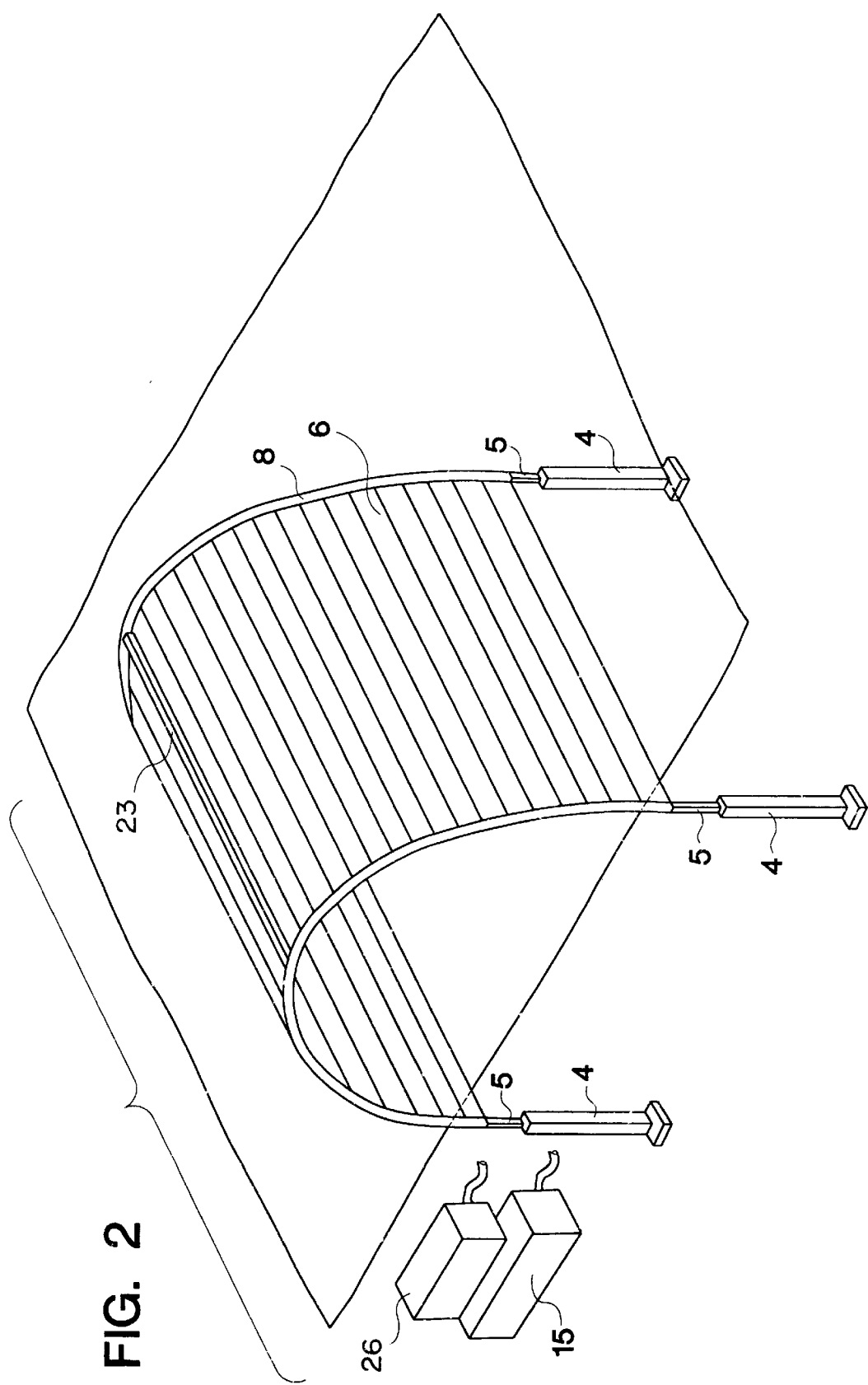
FIG. 2 shows the protective enclosure in its in-use position.

FIG. 2 shows the protective enclosure with the panel members 6 inflated and the telescoping support posts 4 fully extended to encircle and protect the structure 2 (shown in FIG. 1). It should be noted that the telescoping support posts 4 shown in FIG. 2 only have telescoping portions 5, 7, and 8 shown. The number of telescoping portions may vary depending on the size of the structure to be protected.

The telescoping support posts 4 can be made of a variety of material such as steel or plastic. The exact type of material is not critical to the invention except it must be able to withstand the forces that the protector is likely to encounter.

The panel members 6 are shown partially in FIGS. 3 and 4. it should be noted that the panels are shown as rectangular in the drawings, however, this shape is not critical and the panels can be other shapes such as, but not limited to, oval or circular. Actually the panel members 6 can be virtually any shape but the oval or rectangular shapes are preferred. Each panel member 6 consists of a composite bag-like structure that is air tight. The inner side 21 of the panel members 6 (that is the side that faces the structure 2) and the edges of the panel members 6 will be constructed of a rubber or plastic material. The outer side 22 of the panel members 6 (that is the side that faces away from the structure 2) will be constructed of a rubber or plastic material that has flexible steel belts woven throughout the material, similar to the way steel belts are woven into steel belted radial tires for an automobile.

The panel members 6 are shape in a bellows-like configuration (as seen in FIG. 4) so that they may expand or contract as air is pumped into or extracted from the panel members 6, as will be more fully explained below. Each panel member 6 has attached thereto a number of rim pieces 9. The exact number of rim pieces 9 will vary depending on the size of the panel members 6 and the size of the structure 2 to be protected.

The rim pieces 9 will be be made from metal such as steel or aluminum, or they could be made from a plastic such as Nylon or Teflon, and they will be vulcanized or otherwise permanently attached to the panel members 6. The ends of the rim pieces 9 are L-shaped and will interlock with the L-shaped recesses 10 within the carrier 26. The carriers 26 will be attached to the telescoping supports 4 by rings 13 connected to the carrier 26 by rods 12 which will raise the panel members 6 as the panel members 6 are inflated with air.

Each of the panel members 6 will have an opening which will connect to and be sealed with the opening 25 in element 11 connected to the carrier 26 so that air pipes or tubes 27, shown in FIG. 1, can connect an air pump 14 to each of the panels. A single air pump can be used to supply air to all the panels or multiple pumps can be used to supply air to different panels, depending on the size of the structure to be protected.

When not needed the telescoping supports 4 and the panel members 6 will be stored in a trench 3 (as seen in dotted lines in FIG. 1) that surrounds the structure 2. The trench can be lined with concrete or some other material that will prevent the sides from collapsing, and will be large enough to house the telescoping supports 4 and the panel members 6 and the various equipment needed to raise the telescoping supports 4 and the panel members 6, such as motors, gears, and hydraulic pumps.

Attached to each top of the panel members 6 will be a flange 23 which will interlock with a similar flange 24 on an adjacent panel member 6 to secure the panels together at the top of the structure to be protected (see FIG. 7) One of the panel members 6 can have a weight 17 attached in any conventional manner, which will help pull the bottom of the panel members 6 away from the top of the panel members 6 when it is necessary to lower the protective structure. The weight will help the interlocking panels disengage so the panels can be lowered when they are not needed.

Hydraulic lines 16 will be connected to one or more reservoirs 15 with appropriate pumps (not shown) that will supply pressure to raise the supports 4 from the trench 3 to surround the structure to be protected. The pumps could be operated by electricity but should have a battery back up in case the electric service is interrupted by a storm. The pumps could also be operated manually. The same would be true for the air pumps that supply air to inflate the panel members 6.

In addition, the lowermost panel member 6 would have a lip 20 which will engage a lip 18 on a support 19 ( as shown in FIG. 8) which will be mounted within the trench 3. This would help seal and structurally support the bottom of the panel members 6.

When the structure protector is needed, the first step will be to activate the motors that will raise the telescoping supports 4, and at the same time start the air pumps that will inflate the panel members 6. The motors can be activated by any of the normal means such as switches, or the entire system could be controlled by a computer system. There could be a separate motor for panels and telescoping supports on each side and end of the structure or one motor could be connected to all the panels and telescoping supports depending on the size of the structure to be protected.

The panel members 6 will continue to expand until they reach the top of the structure where the interlocking flanges 23, 24 will engage. It should be noted that the flanges 23, 24 could be provided with cooperating sloped surfaces to make it easier for the top panels to ride over one another if needed.

Any natural forces, such as hurricanes and the resultant debris which are blown by the hurricane winds, which hit the structure protector will tend to be, first, channeled over the structure due to its arched shape. Second, the air trapped inside the panel members 6 will form an additional layer of protection, similar to the way a radially belted tire protects itself from road hazards such as curbs, glass, and nails.

As the telescoping supports are raised, the top most part 8 of the support, which is made from a coil spring like structure will bend (as shown in FIG. 10) from the weight of the emerging panels. This will allow the top of section 8 to move toward the center of the roof of the structure until the flanges 23, 24 on adjacent panel members 6 engage and interlock. The flanges can be helped to interlock by adjusting the amount of air in the panels and using the motors to raise and lower the telescoping supports. For example, once the flange 23 passes over the flange 24, a little air could be let out of the panels attached to flange 23. This will allow the flange 23 to sink toward the flange 24. Then by lowering the telescoping supports, the flanges 23, 24 will move relative to one another and inter lock.

When the storm is over, the structure protector can be removed in the reverse order from which it was erected. The telescoping supports will be raised until the flanges 23, 24 are clear of each other, air will be removed from the panels that the flange 24 is attached to until the weight 17 pulls the panels down to the point that flanges 23, 24 will not engage as the telescoping supports are lowered. The pneumatic pumps will be reversed so that air is removed from the panel members 6. As the air is removed, the panels will collapse back into the trench 3. Also, the hydraulic motors will be reversed to lower the telescoping supports 4 back fully into the trench.

Although the Structure Protector and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A protective enclosure for a structure comprising:
   telescoping support members for anchoring around a perimeter of a structure to be protected,
   means for raising and lowering said telescoping support members,
   inflatable panel members attached to said telescoping support members,
   means for inflating and deflating said panel members,
   means for anchoring a bottom of said panel members,
   means for securing adjacent panel members together,
   whereby when said telescoping supports are raised and said panel members are inflated, said structure will be enclosed and protected.

2. The protective enclosure for a structure as claimed in claim 1, wherein said means for raising and lowering said telescoping support members are hydraulic pumps.

3. The protective enclosure for a structure as claimed in claim 1, wherein said means for inflating and deflating said panel members is pneumatic pumps.

4. The protective enclosure for a structure as claimed in claim 1, wherein said inflatable panel members are hollow members and at least one wall of said inflatable panel members has steel belt means for reinforcing said panels.

5. The protective enclosure for a structure as claimed in claim 1, wherein said telescoping support members are composed of a plurality of telescoping members, at least one of which is composed of a coil spring.

6. The protective enclosure for a structure as claimed in claim 1, wherein said means for securing adjacent panel members together is at least a pair of interlocking flange members.

* * * * *